US006064946A

United States Patent [19]

Beerends

[11] Patent Number: 6,064,946

[45] Date of Patent: May 16, 2000

[54] SIGNAL QUALITY DETERMINING DEVICE AND METHOD

[75] Inventor: John Gerard Beerends, The Hague, Netherlands

[73] Assignee: Koninklijke PTT Nederland N.V., Netherlands

[21] Appl. No.: 08/913,038

[22] PCT Filed: Mar. 11, 1996

[86] PCT No.: PCT/EP96/01102

§ 371 Date: Sep. 5, 1997

§ 102(e) Date: Sep. 5, 1997

[87] PCT Pub. No.: WO96/28953

PCT Pub. Date: Sep. 19, 1996

[30] Foreign Application Priority Data

Mar. 15, 1995 [NL] Netherlands .......................... 9500512

[51] Int. Cl.[7] .................................................. G01C 25/00

[52] U.S. Cl. .......................................... 702/57; 702/117

[58] Field of Search ..................... 702/57, 117; 704/500, 704/501, 502

[56] References Cited

U.S. PATENT DOCUMENTS

| | | | |
|---|---|---|---|
| 4,860,360 | 8/1989 | Boggs | 381/48 |
| 5,602,961 | 2/1997 | Kolesnik et al. | 395/2.32 |

FOREIGN PATENT DOCUMENTS

| | | |
|---|---|---|
| 0417739 | 3/1991 | European Pat. Off. . |
| 0627727 | 12/1994 | European Pat. Off. . |
| 3708002 | 9/1988 | Germany . |

OTHER PUBLICATIONS

Beerends, et al, "A Perceptual Speech–Quality Measure Based on a Psychoacoustic Sound Representation", *Journal of the Audio Engineering Society*, vol. 42, No. 3, Mar. 1994, pp. 115–123.

Beerends, et al, "A Perceptual Audio Quality Measure Based on a Psychoacoustic Sound Representation", *Journal of the Audio Engineering Society*, vol. 40, No. 12, Dec. 1192, pp. 963–978.

Beerends, et al, "Modelling a Cognitive Aspect in the Measurement of the Quality of Music Codes", *An Audio Engineering Society Preprint*, presented at the 96$^{th}$ Convention, Feb. 26 –Mar. 1, 1994, pp. 1–13.

John G. Beerends and Jan A. Stemerdink, A Perceptual Audio Quality Measure Based on a Psychoacoustic Sound Representation, Journal of the Audio Engineering, pp. 963–978, Dec. 1992.

*Primary Examiner*—Timothy P. Callahan
*Assistant Examiner*—Linh Nguyen
*Attorney, Agent, or Firm*—Michaelson & Wallace; Peter L. Michaelson

[57] ABSTRACT

A device for determining the quality of an output signal to be generated by a signal processing circuit with respect to a reference signal is provided with a first series circuit for receiving the output signal and with a second series circuit for receiving the reference signal. The device generates an objective quality signal by means of a combining circuit coupled to the two series circuits. Poor correlation between the objective quality signal and a subjective quality signal, to be assessed by human observers, can be considerably improved by disposing a scaling circuit between the two series circuits for scaling at least one series circuit signal. Furthermore, it is also possible to scale the quality signal as a function of the scaling circuit. Poor correlation can be further improved by determining, using a differential arrangement present in the combining circuit, a difference between the two series circuit signals, and then modifying the difference by a certain value, preferably as a function of a series circuit signal

24 Claims, 4 Drawing Sheets

SIGNAL QUALITY DETERMINING DEVICE AND METHOD

BACKGROUND OF THE INVENTION

The invention relates to a device for determining the quality of an output signal to be generated by a signal processing circuit with respect to a reference signal, which device is provided with a first series circuit having a first input for receiving the output signal and is provided with a second series circuit having a second input for receiving the reference signal and is provided with a combining circuit, coupled to a first output of the first series circuit and to a second output of the second series circuit, for generating a quality signal, which first series circuit is provided with a first signal processing arrangement, coupled to the first input of the first series circuit, for generating a first signal parameter as a function of time and frequency, and a first compressing arrangement, coupled to the first signal processing arrangement, for compressing a first signal parameter and for generating a first compressed signal parameter, which second series circuit is provided with a second compressing arrangement, coupled to the second input, for generating a second compressed signal parameter, which combining circuit is provided with a differential arrangement, coupled to the two compressing arrangements, for determining a differential signal on the basis of the compressed signal parameters, and an integrating arrangement, coupled to the differential arrangement, for generating the quality signal by integrating the differential signal with respect to time and frequency Such a device is disclosed in the first reference: J. Audio Eng. Soc., Vol. 40, No. 12, December 1992, in particular "A Perceptual Audio Quality Measure Based on a Psychoacoustic Sound Representation" by John G. Beerends and Jan A. Stemerdink, pages 963–978, more particularly FIG. 7. The device described therein determines the quality of an output signal to be generated by a signal processing circuit, such as, for example, a coder/decoder, or codec, with respect to a reference signal. The reference signal is, for example, an input signal to be presented to the signal processing circuit, although the possibilities also include using, as the reference signal, a pre-calculated ideal version of the output signal. The first signal parameter is generated as a function of time and frequency by means of the first signal processing arrangement, associated with the first series circuit, in response to the output signal, after which the first signal parameter is compressed by means of the first compressing arrangement associated with the first series circuit. In this connection, intermediate operational processing of the first signal parameter should not be ruled out at all. The second signal parameter is compressed by means of the second compressing arrangement, associated with the second series circuit, in response to the reference signal. In this connection, too, further operational processing of the second signal parameter should not be ruled out at all. Of both compressed signal parameters, the differential signal is determined by means of the differential arrangement associated with the combining circuit, after which the quality signal is generated by integrating the differential signal with respect to time and frequency by means of the integrating arrangement associated with the combining circuit.

Such a device has, inter alia, the disadvantage that the objective quality signal to be assessed by means of the device and a subjective quality signal, to be assessed by human observers, have a poor correlation.

SUMMARY OF THE INVENTION

The object of the invention is, inter alia, to provide a device in which, the objective quality signal to be assessed by means of the device and a subjective quality signal to be assessed by human observers have an improved correlation with each other.

For this purpose, the device according to the invention has the characteristic that the device comprises a scaling circuit which is situated between the first series circuit and the second series circuit, which scaling circuit is provided with a further integrating arrangement for integrating a first series circuit signal and a second series circuit signal with respect to frequency, and a comparing arrangement, coupled to the further integrating arrangement, for comparing the two integrated series circuit signals and for scaling at least one series circuit signal in response to the comparison.

As a result of providing the device with the scaling circuit which is situated between the first series circuit and the second series circuit and which comprises the further integrating arrangement and the comparing arrangement, the two series circuit signals are integrated with respect to frequency and then compared, after which at least one series circuit signal is scaled in response to the comparison. The scaling implies increasing or reducing the amplitude of one series circuit signal with respect to the other or increasing and/or reducing the two series circuit signals with respect to one another and takes place between the two series circuits, after which an amplitude amplifier/attenuator is controlled in at least one series circuit from the comparing arrangement. Due to this scaling, good correlation is obtained between the objective quality signal, to be assessed by means of the device, and a subjective quality signal to be assessed by human observers.

The invention is based, inter alia, on the insight that the poor correlation between objective quality signals, to be assessed by means of known devices, and subjective quality signals, to be assessed by human observers, is the consequence, inter alia, of the fact that certain distortions are found to be more objectionable by human observers than other distortions, which poor correlation is improved by using the two compressing arrangements, and is furthermore based, inter alia, on the insight that the two compressing arrangements function better as a result of using the scaling circuit, which further improves the correlation.

The problem of the poor correlation is thus solved by an improved functioning of the two compressing arrangements as a result of using the scaling circuit.

A first embodiment of the device according to the invention has the characteristic that the device comprises an interpretation circuit which is provided with a further comparing arrangement for comparing a further first series circuit signal and a further second series circuit signal, and an adjusting arrangement, situated between the differential arrangement and the integrating arrangement, and coupled to the further comparing arrangement, for adjusting the differential signal in response to the comparison.

As a result of providing the device with the interpretation circuit which comprises the further comparing arrangement and the adjusting arrangement, the differential signal to be generated by the differential arrangement is adjusted as a function of the further first series circuit signal and the further second series circuit signal, as a result of which the integrating arrangement functions better. As a result, the correlation is improved still further.

Preferably, the further comparing arrangement will coincide with the scaling circuit, the latter then having to generate a scaling signal representing the degree of scaling for feeding to the adjusting arrangement which should be disposed between the differential arrangement and the integrating arrangement, for example, in the form of a multiplying arrangement. In this case, very good correlation is obtained.

It should be pointed out that such an adjusting arrangement is disclosed per se in: "Modelling a Cognitive Aspect in the Measurement of the Quality of Music Codecs", by John G. Beerends and Jan A. Stemerdink. This second reference does not disclose, however, the provision of the further comparing arrangement by means of the scaling circuit.

A second embodiment of the device according to the invention has the characteristic that the differential arrangement is provided with a further adjusting arrangement, for reducing the amplitude of the differential signal.

By providing the differential arrangement with the further adjusting arrangement, the amplitude of the differential signal is reduced, as a result of which the integrating arrangement functions still better. As a result, the already very good correlation is further improved.

Preferably, the amplitude of the differential signal is reduced as a function of a series circuit signal, as a result of which the integrating arrangement functions still better. As a result, the already very good correlation is improved still further.

It should be pointed out that the use of the further adjusting arrangement can be viewed completely separately from the use of the scaling circuit and the possible use, associated therewith, of the interpretation circuit. Even if known devices are merely expanded with said further adjusting arrangement alone, the poor correlation will, in fact, be improved to no small degree.

A third embodiment of the device according to the invention has the characteristic that the second series circuit is furthermore provided with a second signal processing arrangement, coupled to the second input, for generating a second signal parameter as a function of both time and frequency, the second compressing arrangement being coupled to the second signal processing arrangement in order to compress the second signal parameter.

If the second series circuit is furthermore provided with the second signal processing arrangement, the second signal parameter is generated as a function of both time and frequency. In this case, the input signal to be presented to the signal processing circuit, such as, for example, a coder/decoder, or codec, whose quality is to be determined, is used as reference signal, in contrast to when a second signal processing arrangement is not used, in which case a pre-calculated ideal version of the output signal should be used as reference signal.

A fourth embodiment of the device according to the invention has the characteristic that a signal processing arrangement is provided with a multiplying arrangement for multiplying in the time domain a signal to be fed to an input of the signal processing arrangement by a window function, and a transforming arrangement, coupled to the multiplying arrangement, for transforming a signal originating from the multiplying arrangement to the frequency domain, which transforming arrangement generates, after determining an absolute value, a signal parameter as a function of time and frequency.

In this connection, the signal parameter is generated, as a function of time and frequency, by the first and/or second signal processing arrangement as a result of using the multiplying arrangement and the transforming arrangement, which transforming arrangement also performs, for example, the absolute-value determination.

A fifth embodiment of the device according to the invention has the characteristic that a signal processing arrangement is provided with a subband filtering arrangement for filtering a signal to be fed to an input of the signal processing arrangement, which subband filtering arrangement generates, after determining an absolute value, a signal parameter as a function of time and frequency.

In this connection, the signal parameter is generated as a function of time and frequency by the first and/or second signal processing arrangement as a result of using the subband filtering arrangement which also performs, for example, the absolute-value determination.

A sixth embodiment of the device according to the invention has the characteristic that the signal processing arrangement is furthermore provided with a converting arrangement for converting a signal parameter represented by means of a time spectrum and a frequency spectrum to a signal parameter represented by means of a time spectrum and a Bark spectrum.

In this connection, the signal parameter generated by the first and/or second signal processing arrangement and represented by means of a time spectrum and a frequency spectrum is converted into a signal parameter represented by means of a time spectrum and a Bark spectrum by using the converting arrangement.

The invention furthermore relates to a method for determining the quality of an output signal to be generated by a signal processing circuit with respect to a reference signal, which method comprises the following steps of generating a first signal parameter, as a function of time and frequency, in response to the output signal, compressing a first signal parameter and generating a first compressed signal parameter, generating a second compressed signal parameter in response to the reference signal, determining a differential signal on the basis of the compressed signal parameters, and generating a quality signal by integrating the differential signal with respect to time and frequency.

The method according to the invention has the characteristic that the method furthermore comprises the following steps of integrating, with respect to frequency, a first signal to be generated in response to the output signal and a second signal to be generated in response to the reference signal, comparing the integrated first and second signals, and scaling at least one of the first and second signals in response to the comparison.

A first embodiment of the method according to the invention has the characteristic that the method comprises the following steps of comparing a further first signal to be generated in response to the output signal and a further second signal to be generated in response to the reference signal, and adjusting the differential signal in response to the comparison.

A second embodiment of the method according to the invention has the characteristic that the method comprises the step of reducing the amplitude of the differential signal.

A third embodiment of the method according to the invention has the characteristic that the step of generating a second compressed signal parameter in response to the reference signal comprises the following two steps of generating a second signal parameter in response to the reference signal as a function of both time and frequency, and compressing a second signal parameter.

A fourth embodiment of the method according to the invention has the characteristic that the step of generating a first signal parameter, in response to the output signal, as a function of time and frequency, comprises the following two steps of multiplying, in the time domain, a still further first signal to be generated in response to the output signal by a window function, and transforming the still further first signal to be multiplied by the window function to the frequency domain, which represents, after determining an absolute value, a signal parameter as a function of time and frequency.

A fifth embodiment of the method according to the invention has the characteristic that the step of generating a first signal parameter, in response to the output signal, as a function of time and frequency, comprises the following step of filtering a still further first signal to be generated in response to the output signal, which represents, after determining an absolute value, a signal parameter as a function of time and frequency.

A sixth embodiment of the method according to the invention has the characteristic that the step of generating a first signal parameter in response to the output signal as a function of time and frequency also comprises the following step of converting a signal parameter represented by means of a time spectrum and a frequency spectrum to a signal parameter represented by means of a time spectrum and a Bark spectrum.

REFERENCES

J. Audio Eng. Soc., Vol. 40, No. 12, December 1992, in particular, "A Perceptual Audio Quality Measure Based on a Psychoacoustic Sound Representation" by John G. Beerends and Jan A. Stemerdink, pages 963–978 (hereinafter the "Beerends et al publication")

"Modelling a Cognitive Aspect in the Measurement of the Quality of Music Codecs", by John G. Beerends and Jan A. Stemerdink, presented at the 96th Convention Feb. 26–Mar. 1, 1994, Amsterdam U.S. Pat. No. 4,860,360

EP 0 627 727

EP 0 417 739

DE 37 08 002

All the references including the literature cited in these references are deemed to be incorporated in this patent application.

BRIEF DESCRIPTION OF THE DRAWINGS

The invention will be explained in greater detail by reference to an exemplary embodiment shown in the figures. In the figures.

DETAILED DESCRIPTION OF THE INVENTION

Figure 1:
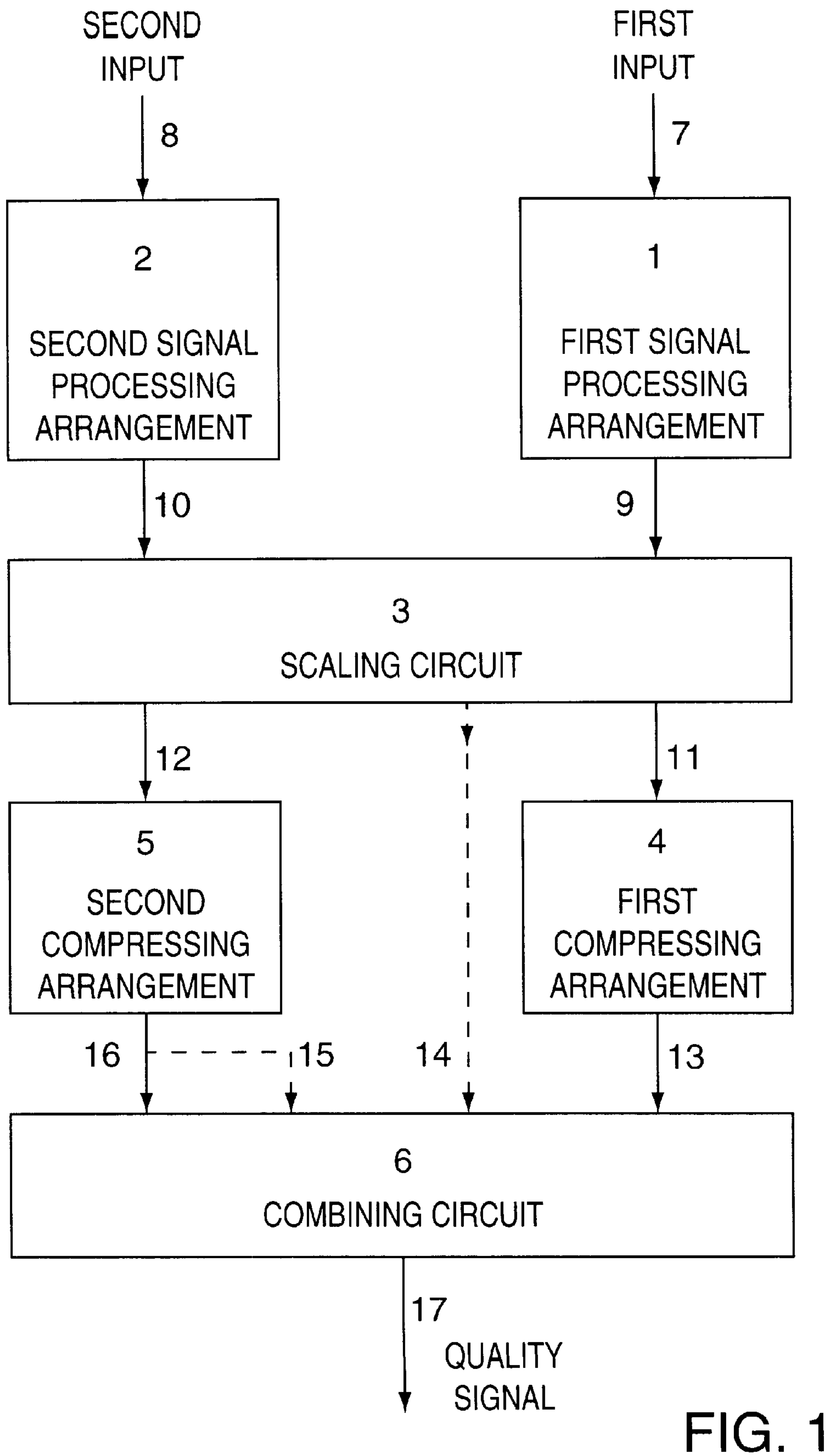
FIG. 1 shows a device according to the invention, comprising known signal processing arrangements, known compressing arrangements, a scaling circuit according to the invention and a combining circuit according to the invention.

The device according to the invention shown in FIG. 1 comprises a first signal processing arrangement 1 having a first input 7 for receiving an output signal originating from a signal processing circuit such as, for example, a coder/decoder, or codec. A first output of first signal processing arrangement 1 is connected via a coupling 9 to a first input of a scaling circuit 3. The device according to the invention furthermore comprises a second signal processing arrangement 2 having a second input 8 for receiving an input signal to be fed to the signal processing circuit such as, for example, the coder/decoder, or codec. A second output of second signal processing arrangement 2 is connected via a coupling 10 to a second input of scaling circuit 3. A first output of scaling circuit 3 is connected via a coupling 11 to a first input of a first compressing arrangement 4, and a second output of scaling circuit 3 is connected via a coupling 12 to a second input of a second compressing arrangement 5. A first output of first compressing arrangement 4 is connected via a coupling 13 to a first input of a combining circuit 6, and a second output of second compressing arrangement 5 is connected via a coupling 16 to a second input of combining circuit 6. A third output of scaling circuit 3 is connected via a coupling 14 to a third input of combining circuit 6, and the second output of second compressing arrangement 5, or coupling 16, is connected via a coupling 15 to a fourth input of combining circuit 6 which has an output 17 for generating a quality signal. First signal processing arrangement 1 and first compressing arrangement 4 jointly correspond to a first series circuit, and second signal processing arrangement 2 and second compressing arrangement 5 jointly correspond to a second series circuit.

Figure 2:
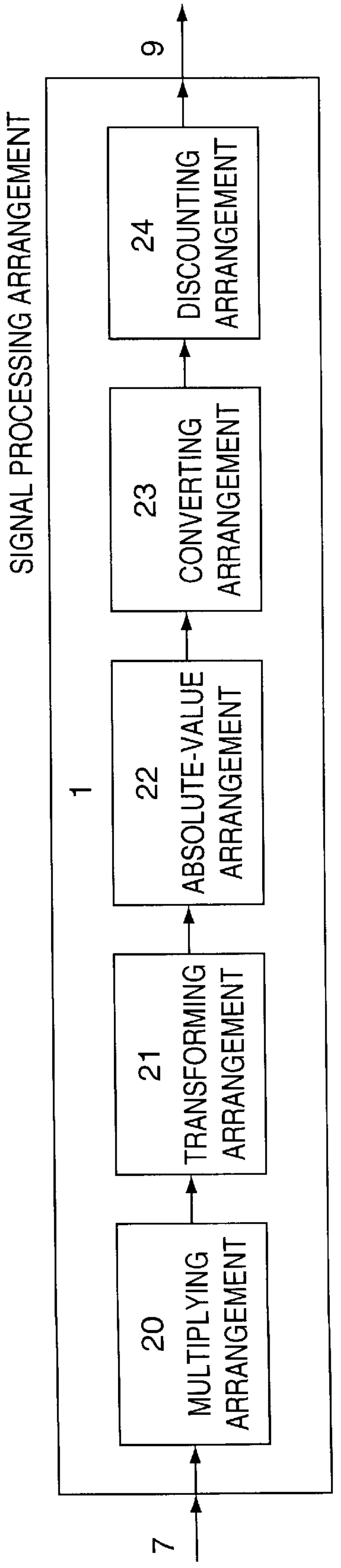
FIG. 2 shows a known signal processing arrangement for use in the device according to the invention.

The known first (or second) signal processing arrangement 1 (or 2) shown in FIG. 2 comprises a first (or second) multiplying arrangement 20 for multiplying in the time domain the output signal (or input signal) to be fed to the first input 7 (or second input 8) of the first (or second) signal processing arrangement 1 (or 2) and originating from the signal processing circuit such as for example, the coder/decoder, or codec, by a window function, a first (or second) transforming arrangement 21, coupled to the first (or second) multiplying arrangement 20, for transforming the signal originating from the first (or second) multiplying arrangement 20 to the frequency domain, a first (or second) absolute-value arrangement 22 for determining the absolute value of the signal originating from the first (or second) transforming arrangement 21 for generating a first (or second) positive signal parameter as a function of time and frequency, a first (or second) converting arrangement 23 for converting the first (or second) positive signal parameter originating from the first (or second) absolute-value arrangement 22 and represented by means of a time spectrum and a frequency spectrum into a first (or second) signal parameter represented by means of a time spectrum and a Bark spectrum, and a first (or second) discounting arrangement 24 for discounting a hearing function in the case of the first (or second) signal parameter originating from the first (or second) converting arrangement and represented by means of a time spectrum and a Bark spectrum, which signal parameter is then transmitted via the coupling 9 (or 10).

Figure 3:
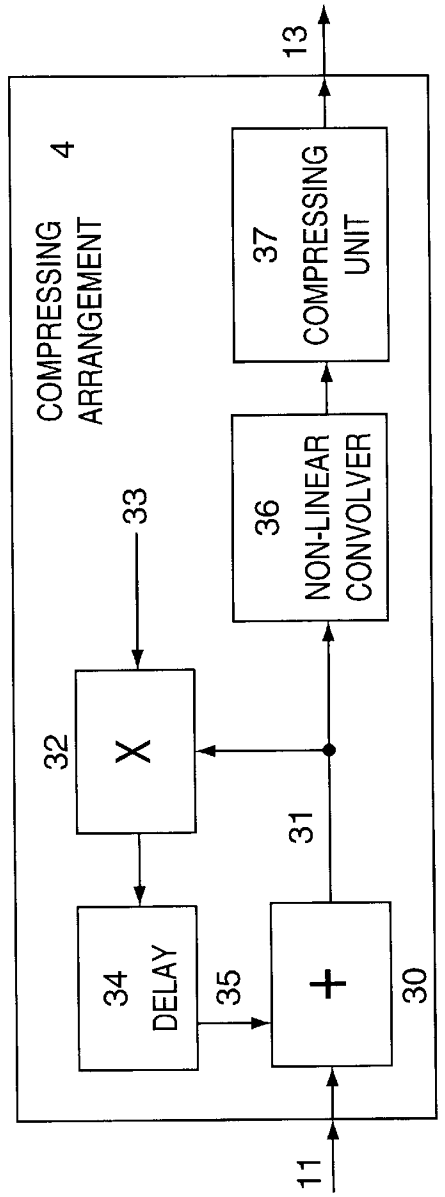
FIG. 3 shows a known compressing arrangement for use in the device according to the invention.

The known first (or second) compressing arrangement 4 (or 5) shown in FIG. 3 receives via coupling 11 (or 12) a signal parameter which is fed to a first (or second) input of a first (or second) adder 30, a first (or second) output of which is connected via a coupling 31, on the one hand, to a first (or second) input of a first (or second) multiplier 32 and, on the other hand, to a first (or second) nonlinear convolving arrangement 36 which is furthermore connected to a first (or second) compressing unit 37 for generating via coupling 13 (or 16) a first (or second) compressed signal parameter. First (or second) multiplier 32 has a further first (or second) input for receiving a feed signal and has a first (or second) output which is connected to a first (or second) input of a first (or second) delay arrangement 34, a first (or second) output of which is coupled to a further first (or second) input of the first (or second) adder 30.

Figure 4:
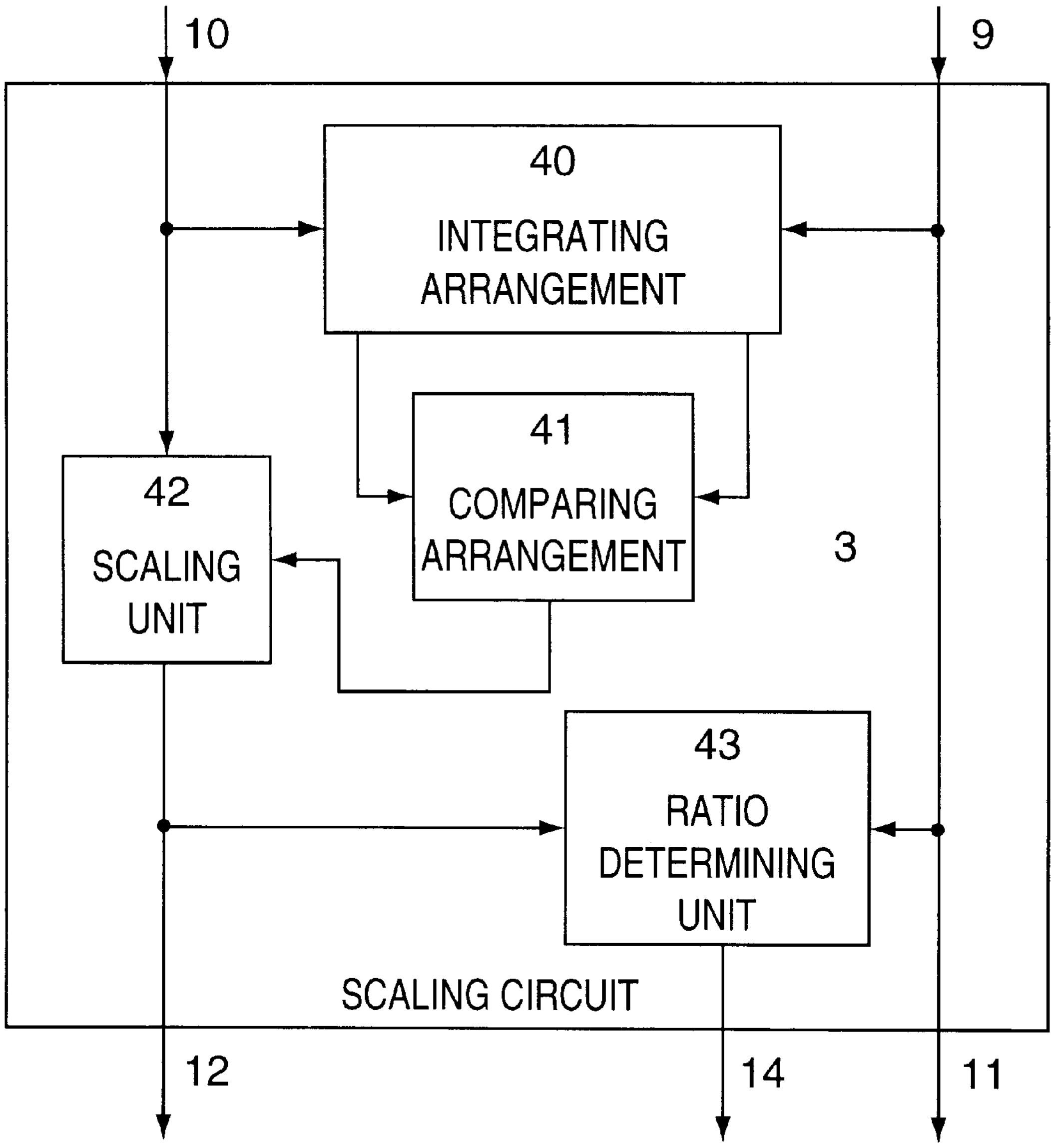
FIG. 4 shows a scaling circuit according to the invention for use in the device according to the invention.

The scaling circuit 3 shown in FIG. 4 comprises a further integrating arrangement 40, a first input of which is connected to the first input of scaling circuit 3 and consequently to coupling 9 for receiving a first series circuit signal (the first signal parameter represented by means of a time spectrum and a Bark spectrum) and a second input of which is connected to the second input of scaling circuit 3 and consequently to coupling 10 for receiving a second series circuit signal (the second signal parameter represented by means of a time spectrum and a Bark spectrum). A first output of further integrating arrangement 40 for generating the integrated first series circuit signal is connected to a first input of a comparing arrangement 41 and a second output of further integrating arrangement 40 for generating the integrated second series circuit signal is connected to a second input of comparing arrangement 41. The first input of scaling circuit 3 is connected to the first output and, via scaling circuit 3, coupling 9 is consequently connected through to coupling 11. The second input of scaling circuit 3 is connected to a first input of a further scaling unit 42 and the second output of sealing circuit 3 is connected to an output of further scaling unit 42 and, via scaling circuit 3, coupling 10 is consequently connected through to coupling 12 via further scaling unit 42. An output of comparing arrangement 41 for generating a control signal is connected to a control input of further scaling unit 42. The first input of scaling circuit 3, or coupling 9 or coupling 11, is connected to a first input of a ratio-determining arrangement 43 and the output of further scaling unit 42, or coupling 12, is connected to a second input of ratio-determining arrangement 43, an output of which is connected to the third output of scaling circuit 3 and consequently to coupling 14 for generating a further scaling signal.

Figure 5:
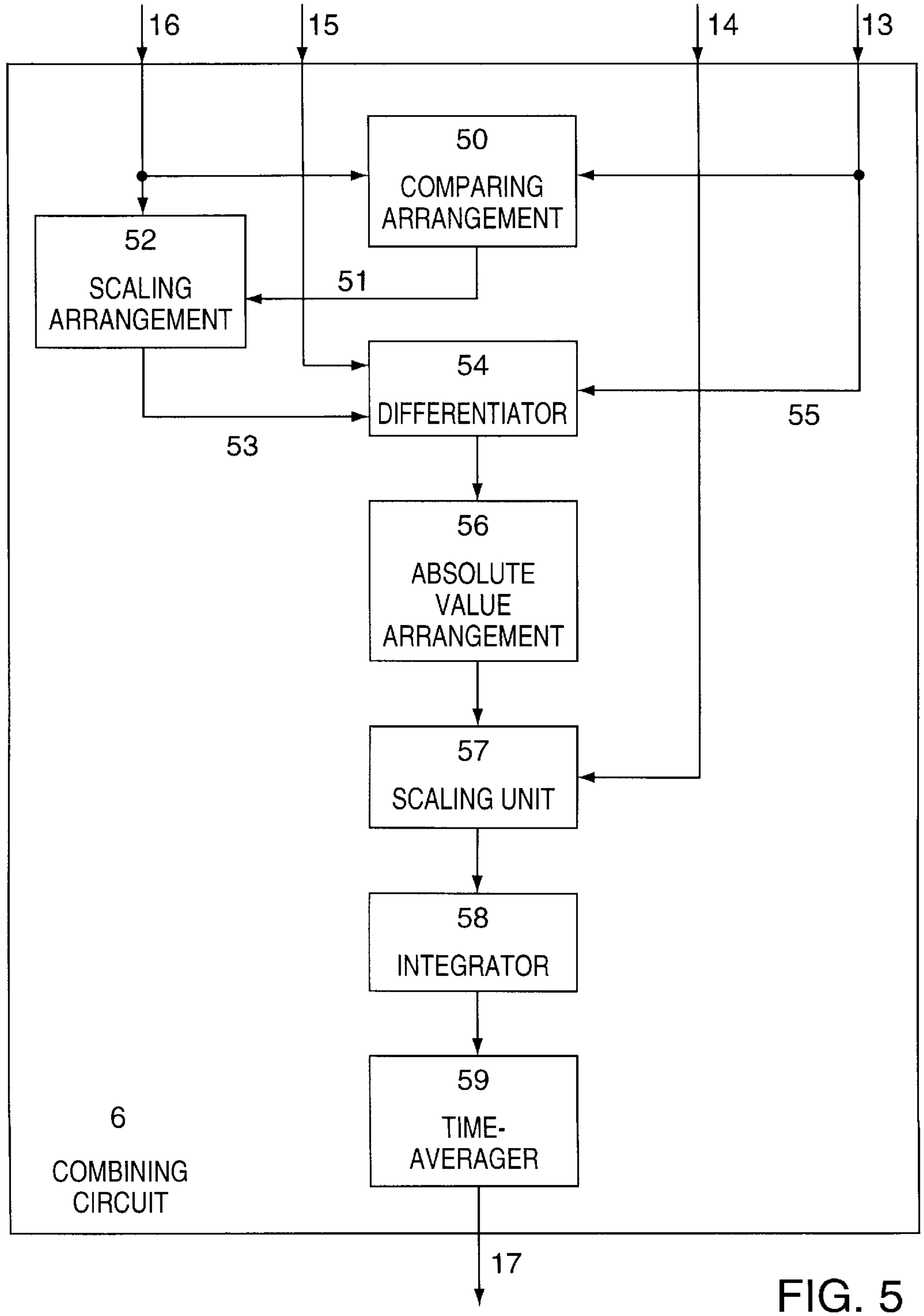
FIG. 5 shows a combining circuit according to the invention for use in the device according to the invention.

The combining circuit 6 shown in FIG. 5 comprises a still further comparing arrangement 50, a first input of which is connected to the first input of combining circuit 6 for receiving the first compressed signal parameter via coupling 13 and a second input of which is connected to the second input of combining circuit 6 for receiving the second compressed signal parameter via coupling 16. The first input of combining circuit 6 is furthermore connected to a first input of a differential arrangement 54,56. An output of still further comparing arrangement 50 for generating a scaling signal is connected, via a coupling 51, to a control input of scaling arrangement 52, an input of which is connected to the second input of combining circuit 6 for receiving the second compressed signal parameter via coupling 16 and an output of which is connected via a coupling 53 to a second input of differential (difference) arrangement 54,56 for determining a differential signal on the basis of the mutually scaled compressed signal parameters. A third input of the differential arrangement 54,56 is connected to the fourth input of the combining circuit 6 for receiving, via coupling 15, the second compressed signal parameter to be received via coupling 16. Differential arrangement 54,56 comprises a differentiator 54 for generating a differential (difference) signal and a further absolute-value arrangement 56 for determining the absolute value of the differential signal, an output of which is connected to an input of scaling unit 57, a control input of which is connected to the third input of combining circuit 6 for receiving the further scaling signal via coupling 14. An output of scaling unit 57 is connected to an input of an integrating arrangement 58,59 for integrating the scaled absolute value of the differential signal with respect to time and frequency. Integrating arrangement 58,59 comprises a series arrangement of an integrator 58 and a time-averaging arrangement 59, an output of which is connected to the output 17 of combining circuit 6 for generating the quality signal.

The operation of a known device for determining the quality of the output signal to be generated by the signal processing circuit such as, for example, the coder/decoder, or codec, which known device is formed without the scaling circuit 3 shown in greater detail in FIG. 4, the couplings 10 and 12 consequently being mutually connected through, and which known device is formed using a standard combining circuit 6, the third input, shown in greater detail in FIG. 5, of differential arrangement 54,56 and scaling unit 57 consequently being missing, is as follows and, indeed, as also described in the Beerends et al publication.

The output signal of the signal processing circuit such as, for example, the coder/decoder, or codec, is fed to input 7, after which the first signal processing circuit 1 converts the output signal into a first signal parameter represented by means of a time spectrum and a Bark spectrum. This takes place by means of the first multiplying arrangement 20 which multiplies the output signal represented by means of a time spectrum by a window function represented by means of a time spectrum. Thereafter, the signal thus obtained and represented by means of a time spectrum is transformed by means of first transforming arrangement 21 to the frequency domain, for example by means of an FFT, or fast Fourier transform. Next, the absolute value of the signal thus obtained and represented by means of a time spectrum and a frequency spectrum is determined by means of the first absolute-value arrangement 22, for example by squaring. Then, the signal parameter thus obtained and represented by means of a time spectrum and a frequency spectrum is converted by means of first converting arrangement 23 into a signal parameter represented by means of a time spectrum and a Bark spectrum, for example, by resampling on the basis of a nonlinear frequency scale, also referred to as Bark scale. The signal parameter is then adjusted by means of first discounting arrangement 24 to a hearing function, or is filtered, for example, by multiplying it by a characteristic represented by means of a Bark spectrum.

The first signal parameter thus obtained and represented by means of a time spectrum and a Bark spectrum is then converted by means of the first compressing arrangement 4 into a first compressed signal parameter represented by means of a time spectrum and a Bark spectrum. This takes place by means of first adder 30, first multiplier 32 and first delay arrangement 34. The signal parameter represented by means of a time spectrum and a Bark spectrum is multiplied by a feed signal represented by means of a Bark spectrum such as, for example, an exponentially decreasing signal, after which the signal parameter thus obtained and represented by means of a time spectrum and a Bark spectrum is added, with a delay in time, to the signal parameter represented by means of a time spectrum and a Bark spectrum. Next, the signal parameter thus obtained and represented by means of a time spectrum and a Bark spectrum is convoluted by means of first nonlinear convoluting arrangement 36 with a spreading function represented by means of a Bark spectrum. Then, the signal parameter thus obtained and represented by means of a time spectrum and a Bark spectrum is compressed by means of first compressing unit 37.

In a corresponding manner, the input signal of the signal processing circuit such as, for example, the coder/decoder, or codec, is fed to input 8, after which the second signal processing circuit 2 converts said input signal into a second signal parameter represented by means of a time spectrum and a Bark spectrum, and the latter is converted by means of the second compressing arrangement 5 into a second compressed signal parameter represented by means of a time spectrum and a Bark spectrum.

The first and second compressed signal parameters, respectively, are then fed via the respective couplings 13 and 16 to combining circuit 6, it being assumed for the time being that this is a standard combining circuit which lacks the third input of differential arrangement 54,56 and scaling unit 57 shown in greater detail in FIG. 5. The two compressed signal parameters are integrated by still further comparing arrangement 50 and mutually compared, after which still further comparing arrangement 50 generates the scaling signal which represents, for example, a average ratio between the two compressed signal parameters. The scaling signal is fed to scaling arrangement 52 which, in response thereto, scales the second compressed signal parameter (that is to say, increases or reduces it as a function of the scaling signal). Obviously, scaling arrangement 52 could also be used, in a manner known to the person skilled in the art, for scaling the first compressed signal parameter instead of for scaling the second compressed signal parameter and use could furthermore be made, in a manner known to the person skilled in the art, of two scaling arrangements for mutually scaling the two compressed signal parameters at the same time. The differential signal is derived by means of differentiator 54 from the mutually scaled compressed signal parameters, the absolute value of which differential signal is then determined by means of further absolute-value arrangement 56. The signal thus obtained is integrated by means of integrator 58 with respect to a Bark spectrum and is integrated by means of time-averaging arrangement 59 with respect to a time spectrum and generated by means of output 17 as the quality signal which indicates in an objective manner the quality of the signal processing circuit such as, for example, the coder/decoder or codec.

The operation of the device according to the invention for determining the quality of the output signal to be generated by the signal processing circuit such as, for example, the coder/decoder, or codec, which device according to the invention is consequently formed with the scaling circuit 3 shown in greater detail in FIG. 4. The couplings 10 and 12 are consequently coupled through mutually via further scaling unit, and which known device is formed with an expanded combining circuit 6 according to the invention to which the third input of differential arrangement 54,56 shown in greater detail in FIG. 5 and scaling unit 57 have consequently been added is as described above, supplemented by what follows.

The first series circuit signal (the first signal parameter represented by means of a time spectrum and a Bark spectrum) to be received via coupling 9 (and the first input of scaling circuit 3) is fed to the first input of further integrating arrangement 40 and the second series circuit signal (the second signal parameter represented by means of a time spectrum and a Bark spectrum) to be received, via the coupling 10 (and the second input of scaling circuit 3) is fed to the second input of further integrating arrangement 40, which integrates the two series circuit signals with respect to frequency. Then, the integrated first series circuit signal is fed, via the first output of further integrating arrangement 40, to the first input of comparing arrangement 41 and the integrated second series circuit signal is fed, via the second output of further integrating arrangement 40, to the second input of comparing arrangement 41. The latter compares the two integrated series circuit signals and generates, in response thereto, the control signal which is fed to the control input of further scaling unit 42. The latter scales the second series circuit signal (the second signal parameter represented by means of a time spectrum and a Bark spectrum) to be received, via coupling 10 (and the second input of scaling circuit 3), a function of said control signal (that is to say increases or reduces the amplitude of said second series circuit signal) and generates the thus scaled second series circuit signal, via the output of further scaling unit 42 to the second output of scaling circuit 3. At the same time, the first input of scaling arrangement 3 is connected through in this example in a direct manner to the first output of scaling circuit 3. In this example, the first series circuit signal and the scaled second series circuit signal, respectively are passed, via scaling circuit 3 to first compressing arrangement 4 and second compressing arrangement 5, respectively.

As result of this further scaling, a good correlation is obtained between the objective quality signal to be assessed by means of the device according to the invention and a subjective quality signal to be assessed by human observers. This invention is based, inter alia, on the insight that the poor correlation between objective quality signals, to be assessed by means of known devices, and subjective quality signals, to be assessed by human observers, is the consequence, inter alia, of the fact that certain distortions are found to be more objectionable by human observers than other distortions, which poor correlation is improved by using the two compressing arguments. The invention is furthermore based, inter alia, on the insight that, as a result of using scaling circuit 3, the two compressing arrangements 4 and 5 function better with respect to one another, which further improves the correlation. The problem of the poor correlation is consequently solved by an improved functioning of the two compressing arrangements 4 and 5 with respect to one another as a result of using scaling circuit 3.

As a result of the fact that the first input of scaling circuit 3, or coupling 9 or coupling 11, is connected to the first input of ratio-determining arrangement 43 and the output of further scaling unit 42, or coupling 12, is connected to the second input of ratio-determining arrangement 43, ratio-determining arrangement 43 is capable of assessing a mutual ratio of the first series circuit signal and the scaled second series circuit signal and of generating a further scaling signal as a function thereof by means of the output of ratio-determining arrangement 43. The further scaling signal is fed via the third output of scaling circuit 3 and consequently, via coupling 14, to the third input of combining circuit 6. The further scaling signal is fed in combining circuit 6 to scaling unit 57 which scales, as a function of the further scaling signal, the absolute value of the differential signal originating from the differential arrangement 54,56 (that is to say increases or reduces the amplitude of said absolute value). As a consequence thereof, the already improved correlation is improved further as a result of the fact an (amplitude) difference still present between the first series circuit signal and the scaled second series circuit signal in the combining circuit is discounted and integrating arrangement 58,59 functions better as a result.

A further improvement of the correlation is obtained if differentiator 54 (or further absolute-value arrangement 56) is provided with a further adjusting arrangement, not shown in the figures, for example in the form of a subtracting circuit which somewhat reduces the amplitude of the differential signal. Preferably, the amplitude of the differential signal is reduced as a function of a series circuit signal, just as in this example it is reduced as a function of the scaled and compressed second signal parameter originating from second compressing arrangement 5, as a result of which integrating arrangement 58,59 functions better still. As a result, the already very good correlation is even further improved.

The components shown in FIG. 2 of first signal processing arrangement 1 are described, as stated earlier, adequately and in a manner known to the person skilled in the art in the Beerends et al publication. A digital output signal which originates from the signal processing circuit such as, for example, the coder/decoder, or codec, and which is, for example, discrete both in time and in amplitude is multiplied by means of first multiplying arrangement 20 by a window function such as, for example, a so-called cosine square function represented by means of a time spectrum, after which the signal thus obtained and represented by means of a time spectrum is transformed by means of first transforming arrangement 21 to the frequency domain, for example by an FFT, or fast Fourier transform, after which the absolute value of the signal thus obtained and represented by means of a time spectrum and a frequency spectrum is determined by means of the first absolute-value arrangement 22, for example by squaring. Finally, a power density function per time/frequency unit is thus obtained. An alternative way of obtaining this signal is to use a subband filtering arrangement for filtering the digital output signal, which subband filtering arrangement generates, after determining an absolute value, a signal parameter as a function of time and frequency in the form of the power density function per time/frequency unit. First converting arrangement 23 converts the power density function per time/frequency unit, for example, by resampling on the basis of a nonlinear frequency scale, also referred to as Bark scale, into a power density function per time/Bark unit, which conversion is described comprehensively in Appendix A of the Beerends et al publication, and first discounting arrangement 24 multiplies said power density function per time/Bark unit, for example by a characteristic, represented by means of a Bark spectrum, for performing an adjustment on a hearing function.

The components, shown in FIG. 3, of first compressing arrangement 4 are, as stated earlier, described adequately and in a manner known to the person skilled in the art in the Beerends et al publication. The power density function, per time/Bark unit adjusted to a hearing function, is multiplied by means of multiplier 32 by an exponentially decreasing signal such as, for example, $\exp(-T/\tau(z))$. Here T is equal to 50% of the length of the window function and consequently represents half of a certain time interval, after which certain time interval first multiplying arrangement 20 always multiplies the output signal by a window function represented by means of a time spectrum (for example, 50% of 40 msec is 20 msec). In this expression, $\tau(z)$ is a characteristic which is represented by means of the Bark spectrum and is shown in detail in FIG. 6 of the Beerends et al publication. First delay arrangement 34 delays the product of this multiplication by a delay time of length T, or half of the certain time interval. First nonlinear convolves arrangement 36 convolutes the signal supplied by a spreading function represented by means of a Bark spectrum, or spreads a power density function represented per time/Bark unit along a Bark scale, which is described comprehensively in Appendix B of the Beerends et al publication. First compressing unit 37 compresses the signal supplied in the form of a power density function represented per time/Bark unit with a function which, for example, raises the power density function represented per time/Bark unit to the power $\alpha$, where $0<\alpha<1$.

The components, shown in FIG. 4, of scaling circuit 3 can be formed in a manner known to the person skilled in the art. Further integrating arrangement 40 comprises, for example, two separate integrators which separately integrate the two series circuit signals supplied by means of a Bark spectrum, after which comparing arrangement 41 in the form of, for example, a divider, divides the two integrated signals by one another and feeds the division result or the inverse division result as control signal to further scaling unit 42. Unit 42, in the form of, for example, a multiplier or a divider, multiplies or divides the second series circuit signal by the division result or the inverse division result in order to make the two series circuit signals, viewed on average, of equal size. Ratio-determining arrangement 43 receives the first and the scaled second series circuit signal in the form of compressed, spread power density functions represented per time/Bark unit and divides them by one another to generate the further scaling signal in the form of the division result represented per time/Bark unit or the inverse thereof, depending on whether scaling unit 57 is constructed as multiplier or as divider.

The components, shown in FIG. 5, of first combining circuit 6 are, as stated earlier, described adequately and in a manner known to the person skilled in the art in the Beerends et al publication, with the exception of the component 57 and a portion of component 54. Still further comparing arrangement 50 comprises, for example, two separate integrators which separately integrate the two series circuit signals supplied over, for example, three separate portions of a Bark spectrum. Arrangement 50 comprises, for example, a divider which divides the two integrated signals by one another per portion of the Bark spectrum and feeds the division result or the inverse division result as scaling signal to scaling arrangement 52 which, in the form of, for example, a multiplier or a divider, multiplies or divides the respective series circuit signal by the division result or the inverse division result in order to make the two series circuit signals, viewed on average, of equal size per portion of the Bark spectrum. All this is described comprehensively in Appendix F of the Beerends et al publication. Differentiator 54 determines the difference between the two mutually scaled series circuit signals. According to the invention, if the difference is negative, this difference can then be augmented by a constant value and, if the difference is positive, this difference can be reduced by a constant value, for example by detecting whether it is less or greater than the value zero and then adding or subtracting the constant value. It is, however, also possible first to determine the absolute value of the difference by means of further absolute-value arrangement 56 and then to deduct the constant value from the absolute value, in which case a negative final result obviously must not be permitted to be obtained. In this last case, absolute-value arrangement 56 should be provided with a subtracting circuit. Furthermore, it is possible, according to the invention, to discount from the difference a portion of a series circuit signal in a similar manner instead of the constant value or together with the constant value. Integrator 58 integrates the signal originating from scaling unit 57 with respect to a Bark spectrum. Time-averaging arrangement 59 integrates the signal thus obtained with respect to a time spectrum. Consequently, the quality signal is obtained which has a value which is the smaller, as the quality of the signal processing circuit increases.

As already described earlier, the correlation between the objective quality signal, to be assessed by means of the device according to the invention and a subjective quality signal, to be assessed by human observers, is improved by four factors which can be viewed separately from one another:

the use of the scaling circuit 3 without making use of the ratio-determining arrangement 43 and scaling unit 57, the use of the scaling circuit 3 with use being made of ratio-determining arrangement 43 and scaling unit 57, the use of differential arrangement 54,56 which is provided with the third input for receiving a signal having a certain value, which signal should be deducted from the difference to be determined originally, and the use of differential arrangement 54,56 which is provided with the third input for receiving a further signal derived from a series circuit signal having a further certain value, which further signal should be deducted from the difference to be determined originally.

The best correlation is obtained by simultaneous use of all the possibilities.

The widest meaning should be reserved for the term signal processing circuit, in which case, for example, all kinds of audio and/or video equipment can be considered. Thus, the signal processing circuit could be a codec, in which case the input signal is the reference signal with respect to which the quality of the output signal should be determined. The signal processing circuit could also be an equalizer, in which case the quality of the output signal should be determined with respect to a reference signal which is calculated on the basis of an already existing virtually ideal equalizer or is simply calculated. The signal processing circuit could even be a loudspeaker, in which case a smooth output signal could be used as a reference signal, with respect to which quality of a sound output signal is then determined (scaling already takes place automatically in the device according to the invention). The signal processing circuit could furthermore be a loudspeaker computer model which is used to design loudspeakers on the basis of values to be set in the loudspeaker computer model, in which connection a low-volume output signal of said loudspeaker computer model serves as the reference signal and in which connection a high-volume output signal of said loudspeaker computer model then serves as the output signal of the signal processing circuit.

In the case of a calculated reference signal, the second signal processing arrangement of the second series circuit could be omitted as a result of the fact that the operations to be performed by the second signal processing arrangement can be discounted in calculating the reference signal.

I claim:

1. A device for determining the quality of an output signal generated by a signal processing circuit with respect to a reference signal, the device comprising a first series circuit with a first input for receiving the output signal, a second series circuit with a second input for receiving the reference signal, and a combining circuit, coupled to a first output of the first series circuit and to a second output of the second series circuit, for generating a quality signal, wherein the first series circuit comprises:

a first signal processing arrangement, coupled to the first input, for generating a first signal parameter as a function of time and frequency; and a first compressing arrangement for generating a first compressed signal parameter; and wherein the second series circuit comprises:

a second signal processing arrangement, coupled to the second input, for generating a second signal parameter as a function of time and frequency; and a second compressing arrangement for generating a second compressed signal parameter; and wherein the combining circuit comprises:

a differential arrangement, coupled to outputs of the first and second compressing arrangements, for determining a difference signal on the basis of the first and second compressed signal parameters; and an integrating arrangement, coupled to the differential arrangement, for generating the quality signal by integrating the difference signal with respect to time and frequency; and wherein the device further comprises:

a scaling circuit, interposed between the first signal processing arrangement and the first compressing arrangement and between the second signal processing arrangement and the second compressing arrangement, for receiving the first and second signal parameters which define received first and second signal parameters, respectively, and for outputting the first and second signal parameters to corresponding inputs of the first and second compressing arrangements, respectively, wherein at least one of the first and second signal parameters provided to the first and second compressing arrangements is scaled.

2. The device recited in claim 1 wherein the second series circuit comprises a through-connection such that the second signal parameter comprises the reference signal.

3. The device recited in claim 2 wherein at least one of the first and second signal processing arrangements comprises:

a multiplying arrangement for generating a multiplied signal by multiplying, in the time domain, an input signal of said at least one signal processing arrangement by a window function;

a transforming arrangement, coupled to the multiplying arrangement, for transforming the multiplied signal to the frequency domain so as to yield a transformed multiplied signal; and an absolute-value arrangement for determining an absolute-value of the transformed multiplied signal and for generating a positive signal parameter as function of time and frequency, wherein said first or said second signal parameter is a function of said positive signal parameter.

4. The device recited in claim 3 wherein the at least one signal processing arrangement further comprises a converting arrangement for converting the positive signal parameter into a further signal parameter represented by means of a time spectrum and a Bark spectrum, said further signal parameter being included in the first or the second signal parameter where the at least one signal processing arrangement is the first or the second signal processing arrangement, respectively.

5. The device recited in claim 1 wherein the scaling circuit comprises:

a second integrating arrangement for generating first and second integrated series circuit signals by integrating the received first and second signal parameters, respectively, with respect to frequency;

a comparing arrangement, coupled to the second integrating arrangement, for comparing the first and second integrated series circuit signals and for generating a control signal; and a scaling unit for scaling at least one of the received first and second signal parameters in response to the control signal.

6. The device recited in claim 5 wherein the second series circuit comprises a through-connection such that the second signal parameter comprises the reference signal.

7. The device recited in claim 6 wherein at least one of the first and second signal processing arrangements comprises:

a multiplying arrangement for generating a multiplied signal by multiplying, in the time domain, an input signal of said at least one signal processing arrangement by a window function;

a transforming arrangement, coupled to the multiplying arrangement, for transforming the multiplied signal to the frequency domain so as to yield a transformed multiplied signal; and an absolute-value arrangement for determining an absolute-value of the transformed multiplied signal and for generating a positive signal parameter as function of time and frequency, wherein said first or said second signal parameter is a function of said positive signal parameter.

8. The device recited in claim 7 wherein the at least one signal processing arrangement further comprises a converting arrangement for converting the positive signal parameter into a further signal parameter represented by means of a time spectrum and a Bark spectrum, said further signal parameter being included in the first or the second signal parameter where the at least one signal processing arrangement is the first or the second signal processing arrangement, respectively.

9. The device recited in claim 5 wherein at least one of the first and second signal processing arrangements comprises:

a multiplying arrangement for generating a multiplied signal by multiplying, in the time domain, an input signal of said at least one signal processing arrangement by a window function;

a transforming arrangement, coupled to the multiplying arrangement, for transforming the multiplied signal to the frequency domain so as to yield a transformed multiplied signal; and an absolute-value arrangement for determining an absolute-value of the transformed multiplied signal and for generating a positive signal parameter as function of time and frequency, wherein said first or said second signal parameter is a function of said positive signal parameter.

10. The device recited in claim 9 wherein the at least one signal processing arrangement further comprises a converting arrangement for converting the positive signal parameter into a further signal parameter represented by means of a time spectrum and a Bark spectrum, said further signal parameter being included in the first or the second signal parameter where the at least one signal processing arrangement is the first or the second signal processing arrangement, respectively.

11. The device recited in claim 5 wherein at least one of the first and second signal processing arrangements comprises a sub-band filtering arrangement for filtering a signal fed to the input of the at least one signal processing arrangement.

12. The device recited in claim 11 wherein the at least one signal processing arrangement further comprises a converting arrangement for converting the positive signal parameter into a further signal parameter represented by means of a time spectrum and a Bark spectrum, said further signal parameter being included in the first or the second signal parameter where the at least one signal processing arrangement is the first or the second signal processing arrangement, respectively.

13. The device recited in claim 1 wherein at least one of the first and second signal processing arrangements comprises a sub-band filtering arrangement for filtering a signal fed to the input of the at least one signal processing arrangement.

14. The device recited in claim 13 wherein the at least one signal processing arrangement further comprises a converting arrangement for converting the positive signal parameter into a further signal parameter represented by means of a time spectrum and a Bark spectrum, said further signal parameter being included in the first or the second signal parameter where the at least one signal processing arrangement is the first or the second signal processing arrangement, respectively.

15. A method for determining quality of an output signal generated by a signal processing circuit with respect to a reference signal, the method comprising the steps of:

generating a first signal parameter as a function of time and frequency in response to the output signal;

compressing the first signal parameter so as to yield a first compressed signal parameter;

generating a second signal parameter as a function of time and frequency in response to the reference signal;

compressing the second signal parameter so as to yield a second compressed signal parameter;

determining a difference signal in response to the first and second compressed signal parameters; and generating a quality signal by integrating the difference signal with respect to time and frequency, wherein the method further comprises the steps of:

generating a first integrated signal by integrating, with respect to frequency, the first signal parameter so as to yield a first integrated signal;

generating a second integrated signal by integrating, with respect to frequency, the second signal parameter so as to yield a second integrated signal;

comparing the first and second integrated signals and, in response thereto, generating a comparison signal; and scaling at least one of the first and second signal parameters in response to the comparison signal.

16. The method recited in claim 15 wherein the first signal parameter generating step comprises the steps of:

multiplying, in the time domain, the output signal by a window function so as to yield a multiplied signal; and transforming the multiplied signal to the frequency domain so as to yield a transformed multiplied signal which represents, after determining an absolute value thereof, a signal parameter as a function of time and frequency.

17. The method recited in claim 16 wherein the first signal parameter generating step further comprises the step of converting the transformed multiplied signal to a signal parameter represented by a time spectrum and a Bark spectrum.

18. The method recited in claim 15 wherein the second signal parameter comprises the reference signal.

19. The method recited in claim 18 wherein the first signal parameter generating step comprises the steps of:

multiplying, in the time domain, the output signal by a window function so as to yield a multiplied signal; and transforming the multiplied signal to the frequency domain so as to yield a transformed multiplied signal which represents, after determining an absolute value thereof, a signal parameter as a function of time and frequency.

20. The method recited in claim 19 wherein the first signal parameter generating step further comprises the step of converting the transformed multiplied signal to a signal parameter represented by a time spectrum and a Bark spectrum.

21. The method recited in claim 18 wherein the first signal parameter generating step comprises the step of filtering the output signal so as to yield a filtered signal, which represents, after determining an absolute value thereof, a signal parameter as a function of time and frequency.

22. The method recited in claim 21 wherein the first signal parameter generating step further comprises the step of converting the transformed multiplied signal to a signal parameter represented by a time spectrum and a Bark spectrum.

23. The method recited in claim 15 wherein the first signal parameter generating step comprises the step of filtering the output signal so as to yield a filtered signal, which represents, after determining an absolute value thereof, a signal parameter as a function of time and frequency.

24. The method recited in claim 23 wherein the first signal parameter generating step further comprises the step of converting the transformed multiplied signal to a signal parameter represented by a time spectrum and a Bark spectrum.

* * * * *